(12) United States Patent
Kuo et al.

(10) Patent No.: US 11,053,051 B2
(45) Date of Patent: Jul. 6, 2021

(54) PULP-MOLDED PAPER LID FOR BEVERAGE CUP AND METHOD FOR FABRICATING THE SAME

(71) Applicant: GOLDEN ARROW PRINTING TECHNOLOGY (KUNSHAN) CO., LTD., Kunshan (CN)

(72) Inventors: Chien-Kuan Kuo, New Taipei (TW); Chun-Huang Huang, New Taipei (TW)

(73) Assignee: GOLDEN ARROW PRINTING TECHNOLOGY (KUNSHAN) CO., LTD., Kunshan (CN)

( * ) Notice: Subject to any disclaimer, the term of this patent is extended or adjusted under 35 U.S.C. 154(b) by 153 days.

(21) Appl. No.: 16/370,882

(22) Filed: Mar. 29, 2019

(65) Prior Publication Data
US 2020/0239199 A1 Jul. 30, 2020

(30) Foreign Application Priority Data
Jan. 28, 2019 (CN) .......................... 201910082043.1

(51) Int. Cl.
*B65D 43/02* (2006.01)
*D21J 3/02* (2006.01)

(52) U.S. Cl.
CPC ............ *B65D 43/0208* (2013.01); *D21J 3/02* (2013.01); *B65D 2543/00046* (2013.01);
(Continued)

(58) Field of Classification Search
CPC ...... B65D 43/0208; B65D 2543/00046; B65D 2543/00268; B65D 2543/00351
See application file for complete search history.

(56) References Cited

U.S. PATENT DOCUMENTS

| 4,412,629 A | 11/1983 | Dart et al. |
| 5,624,053 A | 4/1997 | Freek et al. |
(Continued)

FOREIGN PATENT DOCUMENTS

| CN | 2441403 Y | 8/2001 |
| CN | 101637982 A | 2/2010 |
(Continued)

*Primary Examiner* — Jeffrey R Allen
(74) *Attorney, Agent, or Firm* — Cheng-Ju Chiang

(57) ABSTRACT

A pulp-molded paper lid for a beverage cup and a method for fabricating the same is introduced. While said pulp-molded paper lid bears an external pressure to accommodate the convex-ridge ring of the cup body therein, by preloading of an insertion force of said convex-ridge ring, a generating-elasticity device of said pulp-molded paper lid is pre-compressed to compressively deform, along inward directions respectively opposite to radial directions of said pulp-molded paper lid. By removal of said external pressure, a movable bearing wall and an outermost sidewall of said generating-elasticity device exert two reversed elastically-rebound forces by a stretched deformation occurring therebetween, for clamp-retaining two opposed sides of said convex-ridge ring. Said generating-elasticity device is released from the pre-compression to exert preloaded elastic forces along said radial directions, for strengthening the clamp-retention and avoiding the technical problems of the prior arts.

12 Claims, 6 Drawing Sheets

(52) U.S. Cl.
CPC .............. *B65D 2543/00092* (2013.01); *B65D 2543/00268* (2013.01); *B65D 2543/00351* (2013.01); *B65D 2543/00629* (2013.01); *B65D 2543/00685* (2013.01)

(56) References Cited

U.S. PATENT DOCUMENTS

| | | | |
|---|---|---|---|
| 6,932,234 B2 | 8/2005 | D'Amato | |
| 8,196,772 B2 | 6/2012 | Leon et al. | |
| 8,414,464 B2* | 4/2013 | Grischenko | B31B 70/00 493/167 |
| 9,624,007 B2 | 4/2017 | Lai et al. | |
| 2013/0248481 A1* | 9/2013 | Hoekstra | B65D 43/0212 215/321 |
| 2015/0251818 A1* | 9/2015 | Strachan | B65D 47/265 220/254.8 |
| 2016/0198876 A1 | 7/2016 | Mithal | |
| 2018/0086511 A1 | 3/2018 | Lin | |

FOREIGN PATENT DOCUMENTS

| | | |
|---|---|---|
| CN | 201431246 Y | 3/2010 |
| CN | 202807367 U | 3/2013 |
| CN | 103603234 B | 9/2016 |
| CN | 105019315 B | 1/2017 |
| TW | I610007 B | 1/2018 |
| WO | 2011/009229 A1 | 1/2011 |
| WO | 2011/152703 A1 | 12/2011 |
| WO | 2012/072638 A1 | 6/2012 |
| WO | 2013/013550 A1 | 1/2013 |
| WO | 2015/157877 A1 | 10/2015 |

* cited by examiner

PULP-MOLDED PAPER LID FOR BEVERAGE CUP AND METHOD FOR FABRICATING THE SAME

FIELD OF THE INVENTION

The present invention relates to a technical field of a pulp-molded paper lid for a beverage cup and a method for fabricating the pulp-molded paper lid, and more particularly, is related to a pulp-molded paper lid for a beverage cup, which is suitable for automated production.

BACKGROUND OF THE INVENTION

Currently, lots of consumers habitually use a one-serve cup body to contain a brewed-to-drink beverage, such as coffee, tea, juice, milk and set forth, for convenience on carrying the beverage. To avoid said beverage spilled out of said cup body brought by the consumers, a top opening of the cup body is sealed by a cup lid covering thereon. This leads to a possibility of an inner surface of said cup lid directly contacting with said beverage. However, the aforementioned cup lid is made commonly from a polymer-based plastics material. For example, polyethylene, EVOH, polystyrene, polypropylene (PP) or the likes. The consumers frequently drink such a beverage which directly contacts with the kinds of plastics material, especially a beverage brewed under a high temperature (e.g. coffee or tea drinks brewed with a hot water having a temperature higher than 90° C.). During a prolonged period of time, it is liable to invoke the matters in health doubts and food safety for the human body. Furthermore, after the average consumers drink the beverages, most of the used cup lids would be directly treated as trashes that are massively discarded instead of recycling. It is most likely to incur an extreme damage to the environment, rather than accomplish the latest environmental protection requirements of biodegradability or compostability.

To solve the issues involved in the human body health and the environmental protection that said traditional plastic cup lids incurred, a pulp-molded cup lid appearing in the current market is produced by a pulp-molded process, production steps of which include: forming a paper slurry by waste papers and/or natural plant fibers (e.g. palm, cane bagasse, bamboo strips, reeds and set forth) and water, forming a wet pulp body by next proceeding with a suctioning pulp step for the paper slurry, next proceeding with a thermo-compression forming step for the wet pulp body, and making the wet pulp body into a substrate material of the aforementioned pulp-molded cup lid. Nevertheless, compared with the conventional plastic cup lid, the conventional pulp-molded cup lid made of the plant fibers has a weaker structural strength and elasticity, incurring a difficulty of snap-retention with a convex-ridge ring formed around a peripheral edge of the opening of said cup body, for tightly sealing the opening by manual so as to prevent a beverage from being spilled out. Generally speaking, a topside ring would be formed along an outer peripheral edge of the conventional pulp-molded cup lid. Said topside ring has a topmost portion formed with a close end, a bottommost portion formed with a gateway provided for an entry or exit of said convex-ridge ring of said cup body, and an outermost sidewall further formed with a snap-retention structure toward the inside thereof. Said snap-retention structure is substantially the same as an annular latch structure protruded toward a center point of said cup lid. By observing a transverse cross-section of said topside ring, the inwardly-protruded annular latch structure would divide an internal space defined within the transverse cross-section of said topside ring, into a abruptly-constricted space region located on between said close end and said gateway, a first expanded space region neighboring to said close end and located over said abruptly-constricted space region and a second expanded space region neighboring to said gateway and located below said abruptly-constricted space region. And, said first expanded space region neighboring to said close end is formed as similar as a snap-in groove, wherein transversal widths of said abruptly-constricted space region all are smaller than transversal widths of both said first expanded space region and said second expanded space region, and are smaller than a transversely cross-sectional width of said convex-ridge ring of said cup body. While the consumer applies a force on the conventional pulp-molded cup lid to cover up said opening of said cup body, primarily said convex-ridge ring of the opening of said cup body passes through said gateway said topside ring of the conventional pulp-molded cup lid, thereby upwardly entering into said second expanded space region of said topside ring, without any obstruction; furthermore, the transversely cross-sectional width of said convex-ridge ring of said cup body is larger than the transversal width of said abruptly-constricted space region, thereby inducing a pressure of said convex-ridge ring of said cup body on said latch structure to bring along with said outermost sidewall in a slightly outward displacement to enlarge the transversal width of said abruptly-constricted space region until the enlarged-width abruptly-constricted space region admits said convex-ridge ring of said cup body unobstructedly passing therethrough; next, at the same time when said convex-ridge ring of said cup body enters into said first expanded space region (similar to the snap-in groove) of said topside ring, said latch structure makes said convex-ridge ring of said cup body being snap-retained within said first expanded space region (similar to the snap-in groove), thereby accomplishing a snap-retention manner said topside ring of the conventional pulp-molded cup lid with said convex-ridge ring of said cup body. With relation to various-type illustrations of the conventional pulp-molded cup lid having the aforementioned latch structure and/or said snap-in groove structure, please refer to Chinese patent issue Nos. CN2441403Y, CN101637982A, CN201431246Y and CN202807367U, PCT International Publication Nos. WO2011009229A1, WO2013013550A1 and WO2015157877A1, United States patent issue Nos. U.S. Pat. Nos. 4,412,629, 5,624,053 and 8,196,772, and a Taiwanese patent issue No. I610,007. Particularly, in the Chinese patent issue Nos. CN2441403Y, U.S. patent issue Nos. U.S. Pat. Nos. 5,624,053 and 8,196,772, the PCT International Publication Nos. WO2013013550A1, and the Taiwanese patent issue No. I610,007, the conventional pulp-molded cup lid is further introduced where two sides said topside ring of are integrally formed respectively with an outermost sidewall and an internal sidewall both downwardly-extended. Said outermost sidewall and said internal sidewall both located oppositely are spaced apart from each other by a restricting-movement space defined therebetween, thereby rendering said transverse cross-section of said topside ring, formed as a reverse U-shaped cross section. Said internal sidewall said topside ring of is as a rigid structure that is permanently configured at an approximate right angle (i.e. a U-shaped or a ⌐⌐-shaped cave constructed with between said internal sidewall and a central dominating portion both neighbored on each other), such that said internal sidewall would be directly impacted thereon to permanently deform, frequently, by way of an insertion of said convex-ridge ring of said cup body.

However, in their practical productions, the conventional pulp-molded cup lid still invokes several to-be-solved technical problems which comprise: (1) since the entire structure of the conventional pulp-molded cup lid is primarily constructed from plant fibers, a cross section of said latch structure is sized too small to construct an enough weave density of said latch structure with the plant fibers, whereby after the conventional pulp-molded cup lid is formed with said latch structure by the conventional pulp-molded process, it is very apt to cause that said latch structure constructed with plant fibers has an insufficient structural strength, and even at the beginning when a number of the conventional pulp-molded cup lids are used, their latch structures might be collapsed to cause the snap-retention of those conventional pulp-molded cup lids onto said cup body in an ineffective manner; (2) said topside ring and its latch structure of the conventional pulp-molded cup lid are mostly designed into a rigid structure incapable of providing a higher elasticity, whereby after said convex-ridge ring of said cup body presses hard on said latch structure within said topside ring of the conventional pulp-molded cup lid, a permanent deformation might be induced in the outermost sidewall and/or said latch structure of said topside ring, causing said latch structure incapable of springing back and being exactly snap-retained into within a recess defined below said convex-ridge ring of said cup body; (3) in continuing matters of the above-mentioned item (2), since said topside ring of the conventional pulp-molded cup lid belongs to a snap-retention type design, said convex-ridge ring of said cup body would be incapable of effective retention within the space between said outermost sidewall and said internal sidewall, only by both said outermost sidewall and said internal sidewall of said topside ring, as long as said latch structure of said topside ring has permanently deformed or fractured; and (4) when the conventional pulp-molded cup lid is produced by the conventional pulp-molded process, since said latch structure or said snap-in groove structure of the conventional pulp-molded cup lid are formed extending laterally relative to the conventional pulp-molded cup lid, a demolded surface of said latch structure or said snap-in groove structure is rendered at a negative draft angle relative to central longitudinal axes of an upper and lower mold assemblies both used for the thermo-compression forming, in parallel to a demolding direction between the upper and lower mold assemblies; nevertheless, demolded surfaces located in the other portions of said conventional pulp-molded cup lid are formed at positive draft angles such that said upper and lower mold assemblies further need to incorporate the other mold structures or devices having the other demolding direction (e.g. a horizontally demolding direction) therewith, just capable for forming completely said latch structure or said snap-in groove structure. For example, for both a mold groove extended and a sliding block device moved horizontally along a horizontally demolding direction, the thermo-compression forming step is performed at least twice or multiple demold steps are performed in turns comprising firstly performing a vertically-demolding step, and then performing a horizontally-demolding step, such as the Chinese patent issue No. CN105019315B, the U.S. patent issue No. U.S. Pat. No. 9,624,007, the PCT International Publication Nos. WO2011009229A1 and WO2015157877A1, or a vertical mold spring device is configured with auxiliary to formation of said latch structure or said snap-in groove structure, as introduced in the Chinese patent issue No. CN103603234B, or a mold structure is admitted to demold said latch structure or said snap-in groove structure from the lateral side (i.e. an undercut) of the molds, as introduced in the Taiwanese patent issue No. I610,007. Understandingly, since the conventional pulp-molded cup lid simultaneously has different portions that are respectively located at the positive draft angle and the negative draft angle, its mold assembly has to incorporate an extra horizontally-sliding block device or vertical mold spring device therewith, for auxiliary to form the portions (e.g. said latch structure and/or said snap-in groove structure) at a negative draft angle. This would invoke that the mold assembly applied for the conventional pulp-molded process becomes increased in numbers and complicated in its structure, thereby raising a molding hardware cost for the production and a difficulty of maintaining and repair. Also, the laterally-demolding design is apt to invoke the conventional pulp-molded cup lid permanently deformed in a partial structure thereof, its production yield rate getting worse, and each production cycle time extended longer for producing said cup lid, at the same time when its different portions respectively located at the positive draft angle and the negative draft angle are formed respectively in turns.

Therefore, it is essential to provide a pulp-molded paper lid for a beverage cup, which is capable of solving the matters occurred in the aforementioned prior arts.

SUMMARY OF THE INVENTION

In order to solve a variety of technical matters incurred in the aforementioned prior arts, a primary objective of the present invention is to provide a pulp-molded paper lid for a beverage cup, with a generating-elasticity device, wherein while a topside ring of the pulp-molded paper lid bears an external pressure to accommodate a convex-ridge ring of an opening of a body of the corresponding cup, by preloading of an insertion force exerted from said convex-ridge ring, said generating-elasticity device is pre-compressed with a compressive deformation and a displacement occurred therein along inward directions opposite to radial directions of said pulp-molded paper lid, thereby avoiding the technical problems that a rigid internal sidewall firmed permanently at a right angle within the conventional pulp-molded cup lid, is directly impacted by the insertion of the convex-ridge ring of the cup body, to invoke a permanent deformation occurred therein.

Furthermore, another objective of the present invention is to provide a pulp-molded paper lid for a beverage cup, where an outermost sidewall of a topside ring and a movable bearing wall of a generating-elasticity device both are formed respectively with two guiding slopes extended downwardly far away from each other and, each of the two guiding slopes is configured on a basis of an inclined plane principle to advantageously guide a sliding movement of the convex-ridge ring of the corresponding cup body into a downwardly-increased space region defined between said movable bearing wall and said outermost sidewall, thereby avoiding the technical problems that the internal sidewall and/or the outermost sidewall of the topside ring of the conventional pulp-molded paper lid is directly impacted by the insertion of the convex-ridge ring of the cup body to permanently deform.

Furthermore, in the present invention, after said convex-ridge ring of said cup body enters into an upwardly-decreased space region defined between said movable bearing wall and said outermost sidewall, said movable bearing wall and said outermost sidewall both respectively exert two reversed elastically-rebound forces by a stretched deformation occurring therebetween, respectively for inherently clamp-retaining two opposed sides of said convex-ridge ring of said corresponding cup body within said upwardly-decreased space region, thereby avoiding the technical problems that a latch structure of the conventional pulp-molded paper lid is incapable of effectively snap-retaining said convex-ridge ring of said cup body as soon as having a permanent deformation or fracture occurred therein.

Furthermore, another objective of the present invention is to provide a pulp-molded paper lid for a beverage cup, wherein after the external pressure for expediting the topside ring of said pulp-molded paper lid accommodating the convex-ridge ring of the cup body is removed, the generating-elasticity device is released from the pre-compression to exert preloaded elastic forces along the radial directions of said pulp-molded paper lid, whereby in addition to the clamp-retentions of said two reversed elastically-rebound forces, the present invention further provides said preloaded elastic forces which are capable to further strengthening the clamp-retentions of said two opposed sides of said convex-ridge ring of said corresponding cup body within between said topside ring and said generating-elasticity device, thereby avoiding the technical problems that said pulp-molded paper lid is incapable of tightly snap-retaining the corresponding cup body, resulted from its insufficient structural strength or elasticity of a part of the latch structure or said snap-in groove structure inside the topside ring of the conventional pulp-molded cup lid.

Furthermore, another objective of the present invention is to provide a pulp-molded paper lid for a beverage cup and a method for fabricating the pulp-molded paper lid, which employs two upper and lower mold assemblies used for a thermo-compression forming in a wet-fiber pulp-molded process, wherein said generating-elasticity device and said topside ring both have demolded surfaces all which are formed at positive draft angles relative to a central longitudinal axis of the two upper and lower mold assemblies in parallel to a demolding direction of the two upper and lower mold assemblies, thereby expediting the demolded surfaces of the entire structure of said pulp-molded paper lid all having the positive draft angles, so as to achieve a capability of simplifying the structures assembled into said mold assembly, reducing the molding hardware costs, conveniently maintaining and repairing, and shortening the production cycle time for producing each of said pulp-molded paper lids. Thus, it will benefit an automatic mass production of its consistent and continuous production machines, ensuring its higher production yield and quality, and raising its automated production efficiency.

To accomplish the aforementioned objectives, the present invention provides the following technical solutions where a pulp-molded paper lid for a beverage cup, is made by two upper and lower mold assemblies used for a thermo-compression forming in a wet-fiber pulp-molded process, said pulp-molded paper lid for the beverage cup comprises: a topside ring, a central dominating portion and a generating-elasticity device. Said topside ring is formed along an outer peripheral edge of said pulp-molded paper lid and has a close end located on the most top side of said topside ring and an outermost sidewall downwardly-extended from one side of said close end, said topside ring is configured for accommodating a convex-ridge ring around an opening of a body of the corresponding cup which is being inserted. Said central dominating portion is upwardly extended from said pulp-molded paper lid to form an annular sidewall thereon around a central short axis of said pulp-molded paper lid, and to form a beverage outlet thereon. Said generating-elasticity device is located on between said annular sidewall of said central dominating portion and said topside ring. Along radial directions of said pulp-molded paper lid, said generating-elasticity device is respectively integrally formed with a movable bearing wall, a movable linkage wall and at least one bended end interconnecting between said movable bearing wall and said movable linkage wall. Said movable bearing wall is permanently connected to the other opposed side of said close end of said topside ring, thereby expediting disposals of both said movable bearing wall and the outermost sidewall being oppositely spaced apart from each other, along said radial directions of said pulp-molded paper lid. Said movable linkage wall has a fixed end permanently connected to said annular sidewall, wherein while said topside ring of said pulp-molded paper lid accommodates said convex-ridge ring of said corresponding cup body therein by bearing an external pressure thereon, said movable bearing wall directly bears an insertion force of said convex-ridge ring to invoke a compressive deformation occurring in an angled corner of said at least one bended end, thereby accomplishing a pre-compression preloaded on said generating-elasticity device. And, by removal of said external pressure, said angled corner of said at least one bended end is released to elastically rebound deform, thereby accomplishing a manner that said movable bearing wall of said generating-elasticity device is released from the pre-compression to exert preloaded elastic forces, toward said convex-ridge ring of said corresponding cup body, along said radial directions of said pulp-molded paper lid, wherein said preloaded elastic forces are used to clamp-retain said convex-ridge ring of said corresponding cup body within a restricting-movement space defined among said movable bearing wall, said close end and said outermost sidewall.

Preferably, said movable bearing wall and said movable linkage wall both are interconnected with each other via said at least one bended end to construct said angled corner, said angled corner has an included angle smaller than 90 degrees, which makes the entire structure of said generating-elasticity device forming a 'V'-shaped cross section having the same function as a preloaded spring.

Preferably, said movable linkage wall and said annular sidewall both are interconnected with each other via said fixed end to construct a '<'-shaped cross section having an included angle larger than 100 degrees.

Preferably, while said topside ring of said pulp-molded paper lid bears said external pressure to accommodate said convex-ridge ring of said corresponding cup body, said movable linkage wall is pivoted on said fixed end to act, far away from said annular sidewall but near to said movable bearing wall, with occurrence of a reflection deformation or a stretched deformation therein.

Preferably, while said topside ring of said pulp-molded paper lid bears said external pressure to accommodate said convex-ridge ring of said corresponding cup body, said movable bearing wall and said at least one bended end both are acted, by preloading of said insertion force of said convex-ridge ring, in a displacement along inward directions respectively opposite to said radial directions of said pulp-molded paper lid, and by removal of said external pressure, said movable bearing wall and said at least one bended end both are acted in an elastic rebound displacement along said radial directions of said pulp-molded paper lid.

Preferably, by removal of said external pressure, said angled corner of said at least one bended end and said movable linkage wall both are acted with elastic rebound deformations to make said movable bearing wall being released from the pre-compression to exert said preloaded elastic forces, along said radial directions of said pulp-molded paper lid, for retaining said convex-ridge ring of said corresponding cup body.

Preferably, said outermost sidewall has an inner side formed with an inflection point thereon, said inflection point divides said restricting-movement space into an upwardly-decreased space region and a downwardly-increased space region directly connected below said upwardly-decreased space region, said downwardly-increased space region is defined between low half portions of both said movable bearing wall and said outermost sidewall, said movable bearing wall and said outermost sidewall both are respectively formed with two guiding slopes extended downwardly far away from each other, each of said two guiding slopes is configured on a basis of an inclined plane principle, for guiding advantageously a sliding movement of said convex-ridge ring of said corresponding cup body into said downwardly-increased space region, through an annular downward groove formed on a bottom portion of said downwardly-increased space region.

Preferably, after said convex-ridge ring of said corresponding cup body passes through said inflection point of said outermost sidewall to be inserted from said downwardly-increased space region into said upwardly-decreased space region, said movable bearing wall and said outermost sidewall both respectively exert two reversed elastically-rebound forces by a stretched deformation occurring between said movable bearing wall and said outermost sidewall, for clamp-retaining two opposed sides of said convex-ridge ring of said corresponding cup body within said upwardly-decreased space region.

Preferably, said outermost sidewall is formed with a skirt extended outwardly and transversally at an end thereof, and an included angle smaller than 180 degrees, defined between said skirt and said outermost sidewall.

Preferably, said generating-elasticity device and said topside ring both have demolded surfaces which are formed at positive draft angles relative to a central longitudinal axis of said upper and lower mold assemblies.

Preferably, a protective layer is further formed on an outer surface of the pulp-molded paper lid to prevent the pulp-molded paper lid from shrink-deforming after contacting with a moisture.

The present invention further provides the following technical solutions. A pulp-molded paper lid for a beverage cup, made by two upper and lower mold assemblies used for a thermo-compression forming in a wet-fiber pulp-molded process. Said pulp-molded paper lid comprises: a topside ring, a central dominating portion and a generating-elasticity device. Said topside ring is formed along an outer peripheral edge of said pulp-molded paper lid and has an outermost sidewall located on a side of said topside ring and downwardly extended, said topside ring is configured for accommodating an insertion of a convex-ridge ring of an opening of a body of the corresponding cup. Said central dominating portion is upwardly extended from said pulp-molded paper lid to form an annular sidewall thereon around a central short axis of said pulp-molded paper lid, and to form a beverage outlet thereon. Said generating-elasticity device is located on between said annular sidewall of said central dominating portion and said topside ring. Along radial directions of said pulp-molded paper lid, said generating-elasticity device is respectively integrally formed with a movable bearing wall, a movable linkage wall and at least one bended end interconnecting between said movable bearing wall and said movable linkage wall. Said movable bearing wall is permanently connected to the other opposed side of said topside ring, said movable linkage wall is permanently connected to said annular sidewall, a first transversely cross-sectional width is defined among said movable bearing wall, said movable linkage wall and said at least one bended end and is extended along said radial directions of said pulp-molded paper lid. While said topside ring of said pulp-molded paper lid accommodates said convex-ridge ring of said corresponding cup body therein by bearing an external pressure thereon, the first transversely cross-sectional width of said generating-elasticity device is acted as pre-compressed, with a compressive deformation occurring therein along said radial directions of said pulp-molded paper lid, to become a second transversely cross-sectional width. By moving said external pressure, said generating-elasticity device is released from the pre-compression to exert preloaded elastic forces, through said movable bearing wall, toward said convex-ridge ring of said corresponding cup body, along said radial directions of said pulp-molded paper lid, and said second transversely cross-sectional width becomes a third transversely cross-sectional width. Said preloaded elastic forces are used to clamp-retain said convex-ridge ring of said corresponding cup body within between said movable bearing wall and said outermost sidewall. Said third transversely cross-sectional width is smaller than each of said first transversely cross-sectional width and said second transversely cross-sectional width.

Preferably, said second transversely cross-sectional width is smaller than said first transversely cross-sectional width.

Preferably, said generating-elasticity device and said topside ring both have demolded surfaces which are formed at positive draft angles relative to a central longitudinal axis of said upper and lower mold assemblies.

The present invention further provides the following technical solutions. A method for fabricating a pulp-molded paper lid for a beverage cup is performed by a wet-fiber pulp-molded process, which comprises a suctioning-slurry and pre-compression step, a thermo-compression forming step and a one-time demold step. Said suctioning-slurry and pre-compression step comprises: collecting a slurry and then pre-compressing the collected slurry into a wet pulp body. Said thermo-compression forming step comprises: performing at least one-time thermo-compression formation of said wet pulp body by mutually matching two upper and lower mold assemblies, to form a product of said pulp-molded paper lid, wherein said product of said pulp-molded paper lid comprises a topside ring, a central dominating portion and a generating-elasticity device. Said topside ring is formed along an outer peripheral edge of said product of said pulp-molded paper lid and has an outermost sidewall located on a side of said topside ring and downwardly extended, said topside ring is configured for accommodating an insertion of a convex-ridge ring of an opening of a body of the corresponding cup. Said central dominating portion is upwardly extended from said product of said pulp-molded paper lid and is formed with a beverage outlet thereon. Said generating-elasticity device is interconnected between said central dominating portion and said topside ring, along radial directions of said product of said pulp-molded paper lid. Said one-time demold step comprises: forming said product of said pulp-molded paper lid, only along demold directions parallel to said central longitudinal axis of said upper and lower mold assemblies, by said generating-elasticity device and said topside ring both which have demolded surfaces formed at positive draft angles relative to a central longitudinal axis of said upper and lower mold assemblies, for performing a one-time demold.

Preferably, said slurry contains wet fibers which consists of 60% by weight of long plant fibers and 40% by weight of short plant fibers.

Preferably, demolded surfaces of the entire structure of said product of said pulp-molded paper lid all are formed at positive draft angles relative to said central longitudinal axis of the upper and lower mold assemblies.

Preferably, said central dominating portion is upwardly extended from said product of said pulp-molded paper lid to form an annular sidewall around said central longitudinal axis of said product of said pulp-molded paper lid, and said generating-elasticity device is respectively integrally formed with a movable bearing wall along said radial directions of said product of said pulp-molded paper lid, a movable linkage wall and at least one bended end interconnecting between said movable bearing wall and said movable linkage wall. Said movable bearing wall is permanently connected to the other opposed side of said topside ring, and said movable linkage wall is permanently connected to said annular sidewall.

Preferably, the method for fabricating said pulp-molded paper lid further comprises: a protective layer forming step, which comprises: forming a protective layer on an outer surface of said product of said pulp-molded paper lid, for avoiding shrink-deformation resulted from contacting with a moisture.

Preferably, the method for fabricating said pulp-molded paper lid further comprises: a cutting and punching step, which comprises: removing burrs of the most outer peripheral edge of said product of said pulp-molded paper lid, to make said outermost sidewall formed with a skirt extended outwardly and transversally at an end thereof, and punching said central dominating portion to form said beverage outlet.

The present invention provides the following beneficial effects that: compared with the prior arts, while the pulp-molded paper lid of the present invention bears an external pressure to cover up a convex-ridge ring of an opening of a corresponding cup body, a generating-elasticity device of the pulp-molded paper lid is pre-compressed to compressive deform by preloading of an insertion force of said convex-ridge ring, such that both of said movable bearing wall and said at least one bended end of said generating-elasticity device are acted as pre-compressed in displacement along inward directions respectively opposite to said radial directions of said pulp-molded paper lid, and said movable bearing wall and said outermost sidewall both are respectively formed with two guiding slopes extended downwardly far away from each other and each configured on a basis of an inclined plane principle, for guiding advantageously a sliding movement of said convex-ridge ring of said corresponding cup body into said convex-ridge ring of a downwardly-increased space region, thereby avoiding the technical problems of the conventional pulp-molded cup lid where an internal sidewall thereof is likely to be directly impacted to permanently deform by the insertion of the convex-ridge ring of the cup body; furthermore, after said convex-ridge ring of said corresponding cup body is inserted into said upwardly-decreased space region of the pulp-molded paper lid, said movable bearing wall and said outermost sidewall both are capable of respectively exerting two reversed elastically-rebound forces by a stretched deformation occurring therebetween, for clamp-retaining two opposed sides of said convex-ridge ring of said corresponding cup body within said upwardly-decreased space region between said movable bearing wall and said outermost sidewall, thereby avoiding the technical problems of the conventional pulp-molded paper lid where a latch structure thereof having a permanent deformation or a fracture can not effectively snap-retain said convex-ridge ring of said cup body; moreover, after the pulp-molded paper lid of the present invention accommodates said convex-ridge ring of said corresponding cup body therein and said external pressure is removed, said the generating-elasticity device is released from the pre-compression to exert preloaded elastic forces, along radial directions of said pulp-molded paper lid, toward said convex-ridge ring, such that in addition to providing the clamp-retentions of said two elastically-rebound forces, the present invention provides said preloaded elastic forces which are capable to further strengthening the clamp-retention for retaining said two opposed sides of said convex-ridge ring of said cup body within between said topside ring of said pulp-molded paper lid and said generating-elasticity device, thereby avoiding the technical problems that when a part of the latch structure or said snap-in groove structure inside the topside ring of the conventional pulp-molded cup lid has an insufficient structural strength or elasticity, such that said pulp-molded paper lid is incapable of tightly snap-retaining the corresponding cup body. And, in the present invention, by two upper and lower mold assemblies employed for a thermo-compression forming in a wet-fiber pulp-molded process, said generating-elasticity device and said topside ring both have demolded surfaces formed at positive draft angles relative to a central longitudinal axis of the two upper and lower mold assemblies, thereby expediting the demolded surfaces of the entire structure of said pulp-molded paper lid all having the positive draft angles, so as to achieve a capability of simplifying the structures assembled into said mold assembly, reducing its molding hardware costs and making its maintaining and repairing conveniently, shortening the production cycle time for the respective pulp-molded paper lids, for benefiting an automatic mass production of its consistent and continuous production machines, ensuring its higher production yield and quality, and raising its automated production efficiency.

DESCRIPTION OF THE DIAGRAMS

The above and other objects, features, and advantages of the invention will be better understood from the following detailed description thereof when it is considered in conjunction with the accompanying drawings in which.

DETAILED DESCRIPTION OF THE PREFERRED EMBODIMENTS

The following contexts should incorporate with the illustrations with reference to the embodiments of the present invention. Although a variety of technical solutions for the embodiment of the present invention are definitely and completely described, the described embodiments just are a part of embodiments of the present invention but not all of the embodiments thereof. A claim scope of the present invention where is requested to protect is not limited to the described embodiments but is defined in claims thereof. For a person skilled in the art to which the present invention pertains, the other embodiments made with lack of an inventive step based on the embodiments of the present invention still belong to the claim scope protected by the present invention.

Figure 1A:
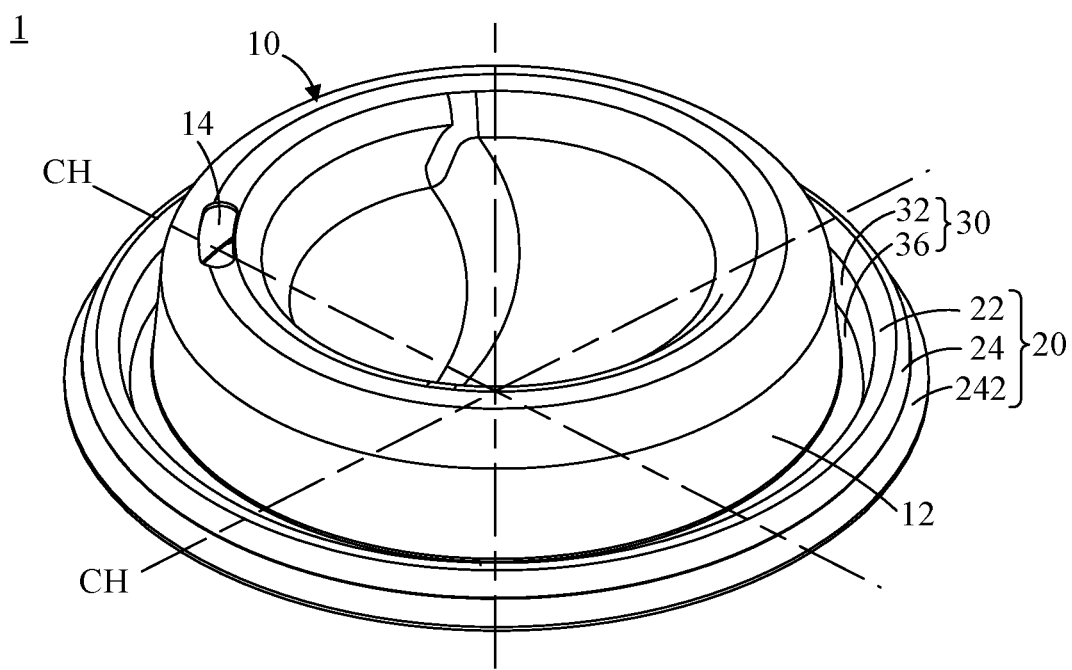
FIG. 1A depicts a perspective topside view of a pulp-molded paper lid for a beverage cup, according to a preferred embodiment of the present invention.
Figure 1B:
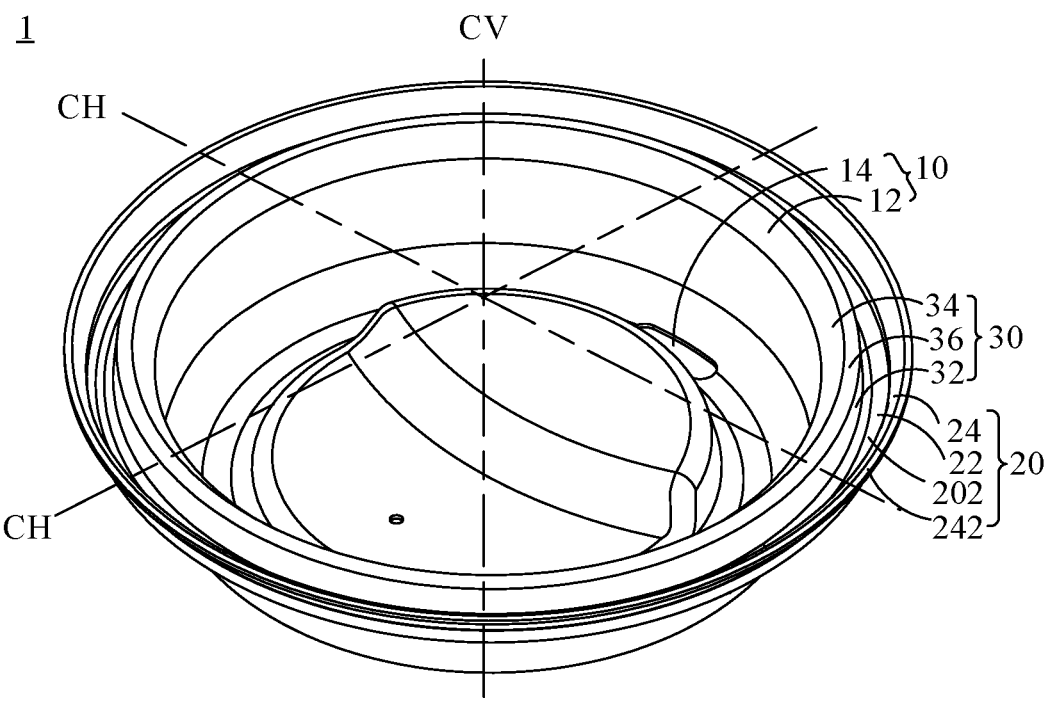
FIG. 1B depicts a perspective bottomside view according to the pulp-molded paper lid depicted in FIG. 1A.

Firstly, please refer to FIGS. 1A and 1B wherein FIG. 1A depicts a perspective topside view of a pulp-molded paper lid 1 for a beverage cup, according to a preferred embodiment of the present invention, and FIG. 1B depicts a perspective bottomside view according to the pulp-molded paper lid 1 depicted in FIG. 1A. The pulp-molded paper lid 1 is produced by consistently and continuously automated production machines with relation to a wet-fiber pulp-mold process. Said wet-fiber pulp-mold process comprise: collecting wet-fiber slurry and pre-compressing the collected wet-fiber slurry into a wet pulp body. Next, by two upper and lower mold assemblies 102, 104 (as referring to FIG. 7) both being matched together with each other, said wet pulp body is thermo-compressively formed to produce a product of said pulp-molded paper lid 1 (detailed below). The mentioned-herein product comprises, but is not limited to, one of a semi-finished product, a ready-to-process product and a finished product of said pulp-molded paper lid 1. Preferably, said slurry contains wet fibers which consists of 60% by weight of long plant fibers and 40% by weight of short plant fibers, thereby strengthening a structurally-interlacing strength of the entire pulp-molded paper lid 1; simultaneously, the pulp-molded paper lid 1 can conform with the regulations of U.S. FDA (Food and Drug Administration) food grade registration certificate, thereby accomplishing the environmental protection requirements for both of the biodegradability and compostability.

Please refer to illustrations of FIGS. 1A and 1B, a structure of said pulp-molded paper lid 1 primarily comprises a central dominating portion 10, a topside ring 20 and a generating-elasticity device 30. Said central dominating portion 10 is upwardly extended from a datum plane where said pulp-molded paper lid 1 is located until forming an annular sidewall 12, on a top surface of said pulp-molded paper lid 1, around a central longitudinal short axis CV of said pulp-molded paper lid 1. Furthermore, a beverage outlet 14 is formed on a top end of said central dominating portion 10 where said annular sidewall 12 is neighbored, and is treated as a passage provided for the user drinking a beverage therethrough.

Figure 2A:
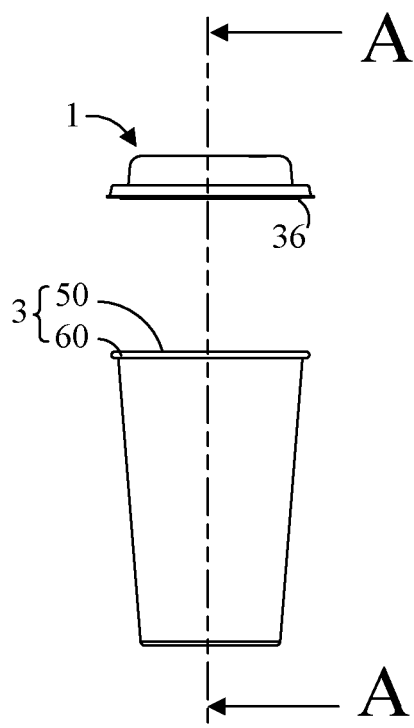
FIG. 2A depicts a frontside view of both of the pulp-molded paper lid depicted in FIG. 1A and a corresponding cup body.
Figure 2B:
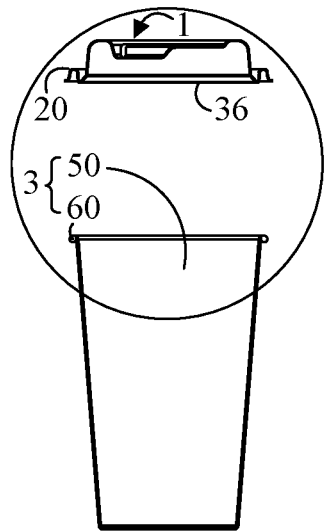
FIG. 2B depicts a laterally cross-sectional diagram along a cutting line A-A of both of the pulp-molded paper lid and the corresponding cup body depicted in FIG. 2A.
Figure 2C:
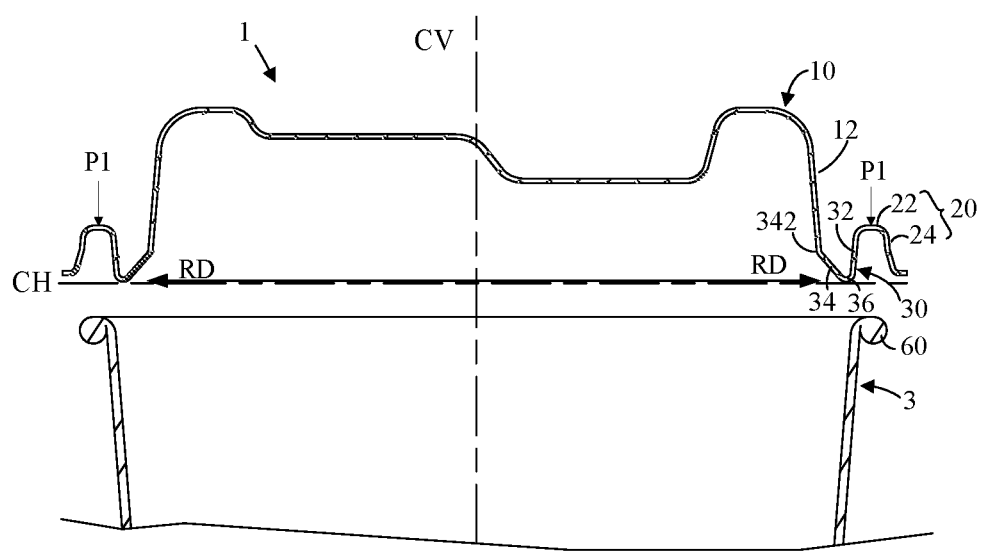
FIG. 2C depicts a partially sliced cross-sectional diagram according to both of the pulp-molded paper lid and the corresponding cup body depicted in FIG. 2B.

Further referring to FIGS. 2A and 2B, FIG. 2A depicts a frontside view of both of the pulp-molded paper lid 1 depicted in FIG. 1A and a corresponding cup body 3, and FIG. 2B depicts a laterally cross-sectional diagram along a cutting line A-A of both of the pulp-molded paper lid 1 and said corresponding cup body depicted in FIG. 2A. A primary function of said topside ring 20 is used for downwardly accommodating therein a convex-ridge ring 60 formed around a peripheral edge of an opening 50 of said corresponding cup body 3 during an insertion thereof. Further referring to FIGS. 1A and 2C, FIG. 2C depicts a partially sliced cross-sectional diagram according to both of the pulp-molded paper lid 1 and said corresponding cup body 3 depicted in FIG. 2B. Said topside ring 20 is formed, along an outer peripheral edge of said pulp-molded paper lid 1, with a close end 22 located on the most top side of said topside ring 20, and an outermost sidewall 24 downwardly-extended from the most outer side of said close end 22.

Further referring to FIGS. 1A and 2C, along each of radial directions RD of said pulp-molded paper lid 1, which is parallel to a transversal central long axis CH of said pulp-molded paper lid 1, said generating-elasticity device 30 is disposed on between said annular sidewall 12 of said central dominating portion 10 and said topside ring 20; in more details, along said radial directions RD of said pulp-molded paper lid 1, said generating-elasticity device 30 is respectively integrally formed with a movable bearing wall 32, a movable linkage wall 34 and at least one movable bended end 36 interconnecting between said movable bearing wall 32 and said movable linkage wall 34. The mentioned-herein "radial directions RD of said pulp-molded paper lid 1" is defined in a manner that: each of the circularly radial directions RD is outwardly and radially extended from a starting point as an origin point where both of said longitudinal central short axis CV and said transversal central long axis CH of said pulp-molded paper lid 1 are intersected. Among them, said movable bearing wall 32 is permanently connected to the other opposed side of said close end 22 of said topside ring 20, thereby respectively making both of said movable bearing wall 32 and said outermost sidewall 24 disposed to be oppositely spaced apart from each other, along said radial directions RD of said pulp-molded paper lid 1. Said movable linkage wall 34 has a fixed end 342 permanently connected to said annular sidewall 12.

Figure 2D:
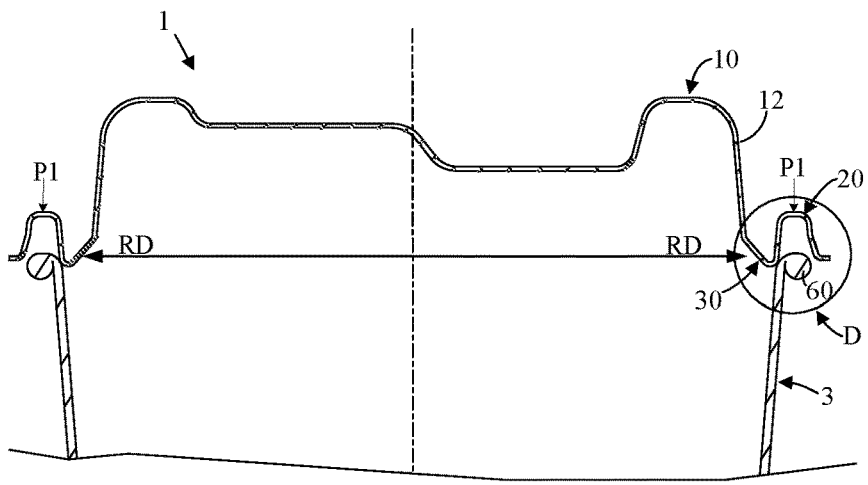
FIG. 2D depicts a partially sliced cross-sectional diagram according to both of the pulp-molded paper lid and the corresponding cup body depicted in FIG. 2C, both of which are ready to be assembled with each other.
Figure 3:
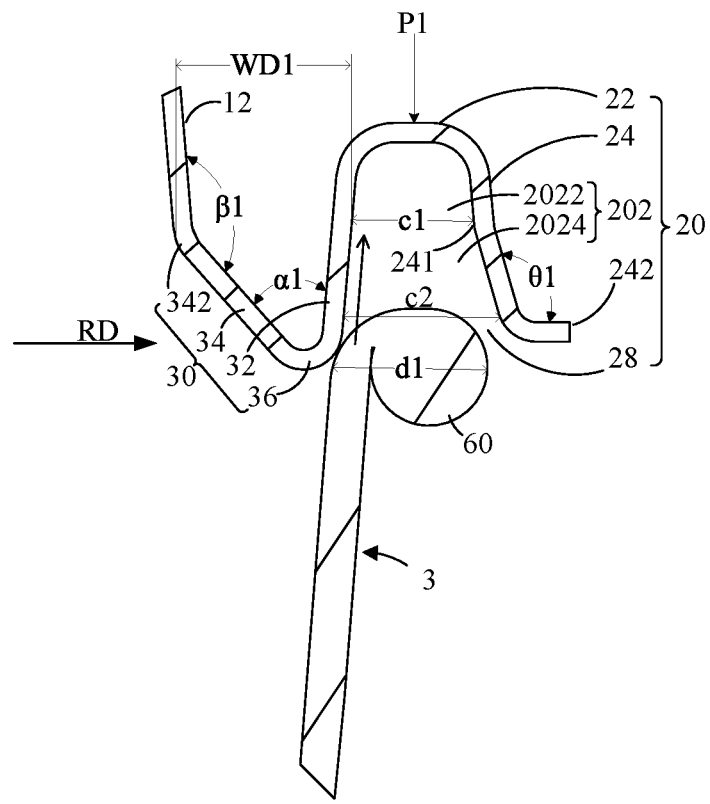
FIG. 3 depicts an enlarged cross-sectional diagram according to a region D circled in FIG. 2D.

Further referring to FIGS. 1A, 2D and 3, FIG. 2D depicts a partially sliced cross-sectional diagram according to both of the pulp-molded paper lid 1 and said corresponding cup body 3 depicted in FIG. 2C, both of which are ready to be assembled with each other, and FIG. 3 depicts an enlarged cross-sectional diagram according to a region D circled in FIG. 2D. A restricting-movement space 202 is defined among said movable bearing wall 32 of said generating-elasticity device 30, and both of said close end 22 and said outermost sidewall 24 of said topside ring 20, along said radial directions RD of said pulp-molded paper lid 1. Preferably, by an inflection point 241 formed on an inner side of said outermost sidewall 24, said restricting-movement space 202 is up-to-down divided into an upwardly-decreased space region 2022 and a downwardly-increased space region 2024 directly connected below said upwardly-decreased space region 2022. The mentioned-herein "inflection point" is defined in a manner of only one intersection point between a top half portion and a low half portion of said inner side of said outermost sidewall 24, and the "inflection point" has the largest slope variation in said inner side. Said upwardly-decreased space region 2022 is primarily defined among a top half portion of said movable bearing wall 32, a bottom side of said close end 22 and a top half portion of said outermost sidewall 24, and is configured for respectively clamp-retaining two opposed sides of said convex-ridge ring 60 of said corresponding cup body 3 within said upwardly-decreased space region 2022 having a transversal width C1. Said downwardly-increased space region 2024 is primarily defined between low half portions of both of said movable bearing wall 32 and said outermost sidewall 24, and said downwardly-increased space region 2024 has a transversal width C2 which is larger than said transversal width C1. Said low half portions of both of said movable bearing wall 32 and said outermost sidewall 24 are respectively formed with two guiding slopes extended downwardly far away from each other, thereby making a bottom portion of said downwardly-increased space region 2024 formed with a annular downward groove 28 which permits the insertion of said convex-ridge ring 60 of said corresponding cup body 3 therein (since a transversal width of said annular downward groove 28 is larger than either of said two transversal widths C1, C2). While said topside ring 20 of said pulp-molded paper lid 1 bears an external pressure P1 applied by a user, to be ready for accommodating said convex-ridge ring 60 of said corresponding cup body 3 therein, since said movable bended end 36 neighbored to said movable bearing wall 32 is downwardly extended to form a length longest than all of the other lengths from a bottom surface contour of said pulp-molded paper lid 1 downwardly extending (see FIGS. 1B, 2A and 2B). And, each of said two guiding slopes of both of said outermost sidewall 24 and said movable bearing wall 32 of said generating-elasticity device 30 is configured on a basis of an inclined plane principle, for guiding advantageously a sliding movement of said convex-ridge ring 60 of said corresponding cup body 3 into said downwardly-increased space region 2024 between said movable bearing wall 34 and said outermost sidewall 24, thereby avoiding the technical problems of the conventional pulp-molded cup lid where the rigid internal sidewall firmed permanently at a right angle thereto might be directly impacted to get permanently deformed, by the insertion of the convex-ridge ring of the cup body. Preferably, as depicted in FIG. 3, said outermost sidewall 24 is further formed with a skirt 242 extended outwardly and transversally at an end thereof. And an included angle θ1 defined by a bend formed between said skirt 242 and said outermost sidewall 24 is smaller than 180 degrees, thereby avoiding the technical problem that a bottom edge of its outermost sidewall 24 might be directly impacted to induce a plane stress fracture thereof while said convex-ridge ring 60 of said corresponding cup body 3 is inserted into said annular downward groove 28.

Besides, in the preferred embodiments illustrated in FIGS. 1A, 2D and 3, a first transversely cross-sectional width WD1 extended along said radial directions RD of said pulp-molded paper lid 1 is defined among said movable bearing wall 32, said movable linkage wall 34 and said at least one movable bended end 36 of said generating-elasticity device 30. Said at least one movable bended end 36 has an angled corner which is constructed by said at least one movable bended end 36 interconnecting between said movable bearing wall 32 and said movable linkage wall 34. Said angled corner has an included angle α1 smaller than 90 degrees, thereby making the entire structure of said generating-elasticity device 30 forming an annular cave with a 'V'-shaped cross section, and functioning as same as an elastic function of a common preloaded spring (not shown). Said annular cave is formed, such as an outer lane, around said annular sidewall 12 of said central dominating portion 10. Said topside ring 20 is formed, such as an outer lane, around said annular cave (see FIG. 1A). However, in the other preferred embodiment, said included angle α1 may be smaller than 80 degrees. Furthermore, in the other preferred embodiment, the entire structure of said generating-elasticity device 30 can be constructed by a number of 'V'-shaped cross sections, for increasing its function as an elastic function of a preloaded spring with a number of rings, wherein said number of 'V'-shaped cross sections are integrally side-by-side cascaded (e.g. a 'W'-shaped cross section) along said radial directions RD of said pulp-molded paper lid 1, thereby strengthening the preloaded elastic forces that the entire structure of said generating-elasticity device 30 is released from the pre-compression to exert. In the preferred embodiment, a '<'-shaped cross section, which is constructed by said fixed end 342 interconnecting between said movable linkage wall 34 and said annular sidewall 12, has an included angle β1 larger than 100 degrees.

Figure 2E:
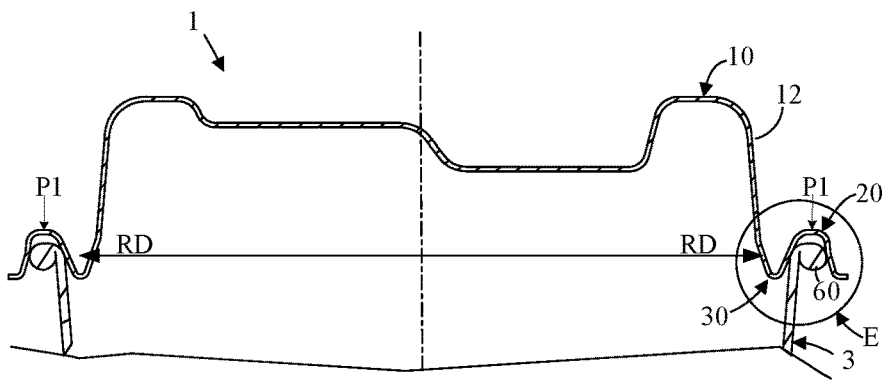
FIG. 2E depicts a partially sliced cross-sectional diagram according to both of the pulp-molded paper lid and the corresponding cup body depicted in FIG. 2D, both of which are further being assembled together, wherein a generating-elasticity device of said pulp-molded paper lid is pre-compressed by preloading of an insertion force of a convex-ridge ring of the corresponding cup body.
Figure 4:
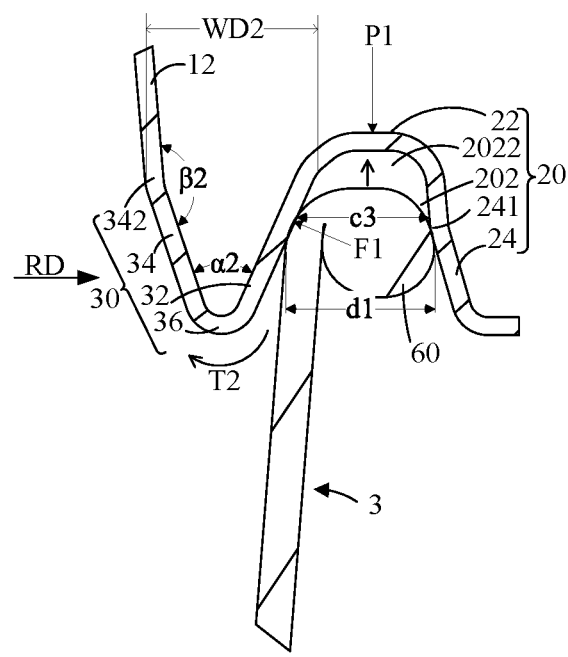
FIG. 4 depicts an enlarged cross-sectional diagram according to a region E circled in FIG. 2E.

Further referring to FIGS. 2E & 4, FIG. 2E depicts a partially sliced cross-sectional diagram according to both of the pulp-molded paper lid 1 and said corresponding cup body 3 depicted in FIG. 2D, both of which are being further assembled together, and FIG. 4 depicts an enlarged cross-sectional diagram according to a region E circled in FIG. 2E. Among them, while said topside ring 20 of said pulp-molded paper lid 1 bears said external pressure P1 to further accommodate said convex-ridge ring 60 of said corresponding cup body 3 during the insertion, two opposed sides of said convex-ridge ring 60 of said cup body 3 will firstly touch with both of said movable bearing wall 32 and said inflection point 241 of said outermost sidewall 24, respectively. By said movable bearing wall 32 directly bearing a preloading of an insertion force F1 of said convex-ridge ring 60 of said corresponding cup body, it facilitates said angled corner of said at least one movable bended end 36 being pre-compressed to compressively deform; namely, said included angle is decreased from α1 (as depicted in FIG. 3) to α2 (as depicted in FIG. 4), wherein α2<α1, thereby expediting said generating-elasticity device 30 acting as compressively deformed, along said radial directions RD of said pulp-molded paper lid 1, with a variation from said first transversely cross-sectional width WD1 (as depicted in FIG. 30) to a second transversely cross-sectional width WD2 (as depicted in FIG. 4), wherein said second transversely cross-sectional width WD2 is smaller than said first transversely cross-sectional width WD1). Simultaneously, said transversal width of said upwardly-decreased space region 2022 is expedited to be enlarged from C1 (as depicted in FIG. 3) into C3 (as depicted in FIG. 4) due to a transversely cross-sectional width d1 of said inserted convex-ridge ring 60, wherein C3> C1 and d1> C1. With the preloading of said insertion force F1 of said convex-ridge ring 60, this will initially accomplish a pre-compression which is reloaded on the entire structure (namely as a 'V'-shaped cross-sectional structure) of said generating-elasticity device 30 where said movable linkage wall 34 is simultaneously pre-compressed to act in a rotative movement T2 pivoted on said fixed end 342, to be far away from said annular sidewall 12 but approaches said movable bearing wall 32. Since a direction of said rotative movement T2 is opposite to said radial directions RD of said pulp-molded paper lid 1, said movable linkage wall 34 is acted with a reflection deformation or a stretched deformation, pivoted on said fixed end 342; namely, its included angle will be enlarged from $\beta 1$ (as depicted in FIG. 3) into $\beta 2$ (as depicted in FIG. 4) wherein $\beta 2>\beta 1$. Said reflection deformation or said stretched deformation of said movable linkage wall 34 is capable of raising the pre-compressing pressure higher for the entire structure of said generating-elasticity device 30.

For more detailed introduction, in the preferred embodiments illustrated in FIGS. 2E & 4, while said topside ring 20 of said pulp-molded paper lid 1 bears said external pressure P1 to further accommodate the insertion of said convex-ridge ring 60 of said corresponding cup body 3, said movable bearing wall 32 and said at least one movable bended end 36 both are further pre-compressed, by the preloading of said insertion force F1 of said convex-ridge ring 60, to act in a compressive displacement along inward directions opposite to said radial directions RD of said pulp-molded paper lid 1. Namely, said pre-compressed movable bearing wall 32 will be acted in a compressive displacement toward a direction approaching said annular sidewall 12 of said central dominating portion 10 but far away from said topside ring 20, thereby avoiding the technical problems of the conventional pulp-molded cup lid where its rigid internal sidewall firmed permanently at a right angle might be directly impacted to permanently deform by the insertion of the convex-ridge ring of the cup body. Furthermore, while said restricting-movement space 202 of said topside ring 20 of said pulp-molded paper lid 1 almost completely accommodates said convex-ridge ring 60 of said corresponding cup body 3 therein, namely, said convex-ridge ring 60 starts to enter within said upwardly-decreased space region 2022 but is restricted in a movement among a bottom side of said close end 22, a top half portion of said movable bearing wall 32 and a top half portion of said outermost sidewall 24. And, while said topside ring 20 continuously bears said external pressure P1, by the preloading of said insertion force F1 of said convex-ridge ring 60, the entire structure of said generating-elasticity device 30 is acted as pre-compressed in a displacement more approaching said annular sidewall 12 of said central dominating portion 10 but more far away from said topside ring 20. In this moment, the pre-compressing pressure is substantially being accumulated highest for said generating-elasticity device 30.

Figure 2F:
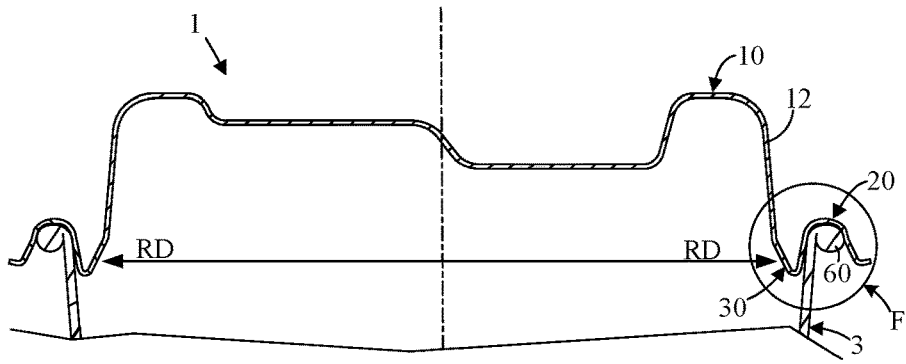
FIG. 2F depicts a partially sliced cross-sectional diagram according to both of the pulp-molded paper lid and the corresponding cup body depicted in FIG. 2E, both of which are completely assembled together with each other, wherein said generating-elasticity device is released from the pre-compression to exert preloaded elastic forces for said convex-ridge ring of said corresponding cup body.
Figure 5:
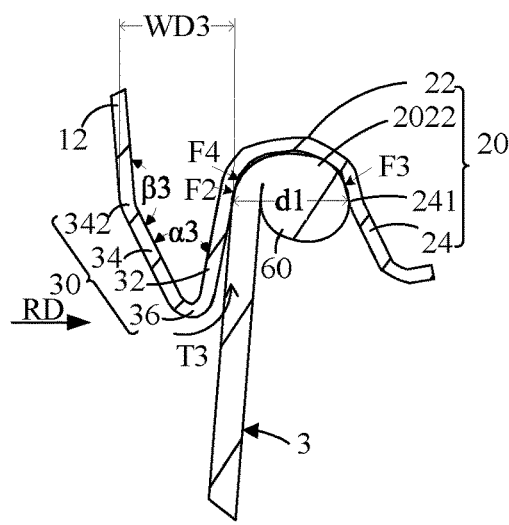
FIG. 5 depicts an enlarged cross-sectional diagram according to a region F circled in FIG. 2F.

Further referring to FIGS. 2F & 5, FIG. 2F depicts a partially sliced cross-sectional diagram according to both of the pulp-molded paper lid 1 and said corresponding cup body 3 depicted in FIG. 2E, both of which are completely assembled together with each other, and FIG. 5 depicts an enlarged cross-sectional diagram according to a region F circled in FIG. 2F. After said convex-ridge ring 60 of said cup body 3 passes through said inflection point 241 of said outermost sidewall 24 to be inserted continuously into said upwardly-decreased space region 2022, it causes that said upwardly-decreased space region 2022 is enlarged by said convex-ridge ring 60 from said transversal width C3 (as depicted in FIG. 4) to another transversal width which is identical to said transversely cross-sectional width d1 of said convex-ridge ring 60 (wherein C3<d1). At the same time when said transversal width of said upwardly-decreased space region 2022 is enlarged, said movable bearing wall 32 and said outermost sidewall 24 both collectively constructing as an elastic structure, can respectively exerts two reversed elastically-rebound forces F2, F3 through both of said movable bearing wall 32 and said outermost sidewall 24, by a stretched deformation occurring between said movable bearing wall 32 and said outermost sidewall 24, for inherently clamp-retaining two opposed sides of said convex-ridge ring 60 of said corresponding cup body 3 within said upwardly-decreased space region 2022 defined between said movable bearing wall 32 and said outermost sidewall 24. Under this manner, there is an interference fit occurring between the upwardly-decreased space region 2022 and the two opposed sides of said corresponding cup body 3. Furthermore, after said upwardly-decreased space region 2022 of said topside ring 20 of said pulp-molded paper lid 1 completely accommodates said convex-ridge ring 60 of said corresponding cup body 3 therein and said external pressure P1 shown in FIG. 4 is removed, the angled corner of said at least one movable bended end 36 and said movable linkage wall 34 both that are previously pre-compressed are released to elastically-rebound deform. For example, said angled corner is released as elastically rebounded to become having another elastic-rebound included angle $\alpha 3$ (wherein $\alpha 3$ (shown in FIG. 5) is smaller than $\alpha 2$ (shown in FIG. 4)), thereby accomplishing a manner that said generating-elasticity device 30 is released from the pre-compression to exert preloaded elastic forces F4, through said movable bearing wall 32, along said radial directions RD of said pulp-molded paper lid 1, toward said convex-ridge ring 60 of said corresponding cup body 3. In more details, said movable bearing wall 32 and said at least one movable bended end 36 both are also acted in an elastic rebound displacement, along said radial directions RD of said pulp-molded paper lid 1. Simultaneously, it further brings said movable linkage wall 34 to act in a rotative movement T3, pivoted on said fixed end 342, to approach both of said annular sidewall 12 and said movable bearing wall 32. Since said rotative movement T3 is directed along said radial directions RD of said pulp-molded paper lid 1, it expedites said movable linkage wall 34 being acted in an elastic rebound deformation pivoted on said fixed end 342; namely, its included angle is decreased from $\beta 2$ (as depicted in FIG. 4) to $\beta 3$ (as depicted in FIG. 5) wherein $\beta 3<\beta 2$, such that said second transversely cross-sectional width WD2 (as depicted in as FIG. 4) of said generating-elasticity device 30 is expedited to become a third transversely cross-sectional width WD3 (wherein said third transversely cross-sectional width WD3 is smaller than either of said first transversely cross-sectional width WD1 and said second transversely cross-sectional width WD2). Consequentially, the elastic rebound deformation of said movable linkage wall 34 will raise said preloaded elastic forces F4 much higher for said convex-ridge ring 60. It is similar to the manner that said generating-elasticity device 30 is acted as released from the pre-compression to exert said preloaded elastic forces F4, along said radial directions RD of said pulp-molded paper lid 1, for accommodating said convex-ridge ring 60 of said corresponding cup body 3 within said upwardly-decreased space region 2022. That is, in addition to the clamp-retention of said two elastically-rebound forces F2, F3, said preloaded elastic forces F4 are capable to further strengthening the clamp-retention with restricting a movement of the two opposed sides of said convex-ridge ring 60 of said corresponding cup body 3 within said upwardly-decreased space region 2022 of said topside ring 20 (namely, said convex-ridge ring 60 is restricted in movement and retained among a bottom side of said close end 22, said movable bearing wall 32 and said outermost sidewall 24).

Figure 6:
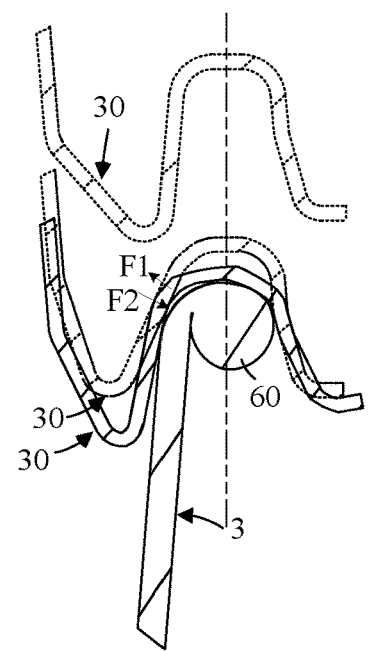
FIG. 6 depicts an operationally schematic diagram of said generating-elasticity device, which is acted in sequential illustrations from FIG. 3 to FIG. 5, in a variety of interactive relationships with regard to said convex-ridge ring of said corresponding cup body.

Further referring to FIG. 6 which depicts an operationally schematic diagram of said generating-elasticity device, which is acted in sequential illustrations from FIG. 3 to FIG. 5, in a variety of interactive relationships, with regard to said convex-ridge ring 60 of said corresponding cup body 3, it is rendered that said generating-elasticity device 30 has the same function as a preloaded spring, which comprises: (1) by preloading of an action force (i.e. said insertion force F1), pre-compressing said generating-elasticity device and thereby further pre-compressing the transversely cross-sectional width (as similar as a compressible length of a common preloaded spring) of said generating-elasticity device 30, and (2) after the action force (i.e. said insertion force F1) that said generating-elasticity device 30 bears is removed, said generating-elasticity device 30 is not only elastically rebounded to the original transversely cross-sectional width but also is further outwardly released from the pre-compression to exert said preloaded elastic forces F4 for clamp-retaining said convex-ridge ring 60. Therefore, by providing a design of said generating-elasticity device 30 with the same function as a preloaded spring function, the present invention is capable of avoiding the following technical problems of the conventional pulp-molded cup lid where the rigid structure design and the latch structure of said topside ring lack an elasticity by itself, such that after the convex-ridge ring of the cup body presses hard on the latch structure inside the topside ring of the conventional pulp-molded cup lid, the outermost sidewall and/or said latch structure of said topside ring might get permanently deformed, thereby invoking said latch structure incapable of elastically rebounding and incapable of sufficiently snap-retaining said convex-ridge ring of said cup body.

Preferably, said pulp-molded paper lid 1 can be further prevented from shrink-deforming after contacting with a moisture, by a protective layer (not shown), as a called "lamination" which is formed over an outer surface of said pulp-molded paper lid 1; especially, said protective layer is formed along the entire outer contours of a bottom surface of said pulp-molded paper lid 1 (see FIG. 1B), thereby preventing said pulp-molded paper lid 1 from shrink-deforming after contacting with a moisture. Preferably, said protective layer is composed of, but is not limited to, an aqueous water-proof material. Said aqueous water-proof material consists of at least one additive. Said at least one additive consists of, but is not limited to, polyacrylic emulsion and a deionized water. Said protective layer has a coating amount of approximate 5-10 g/m2 and an abrasive wear resistance of 4 lbs./400 cycles. Said protective layer can conform with a variety of environmental protection standards RoHS/EN-71/ASTM/REACH/CPSIA. However, it is not therefore limited to the afore-mentioned composition of said protective layer. That is because the other protective layer materials in another embodiment, which are capable of accomplishment of avoiding shrink-deformation resulted from contacting with the moisture, can be adopted. In another embodiment, said protective layer can conform with the regulations of U.S. FDA food grade registration certificate, thereby accomplishing the environmental protection requirements for the biodegradability and compostability.

Figure 7:
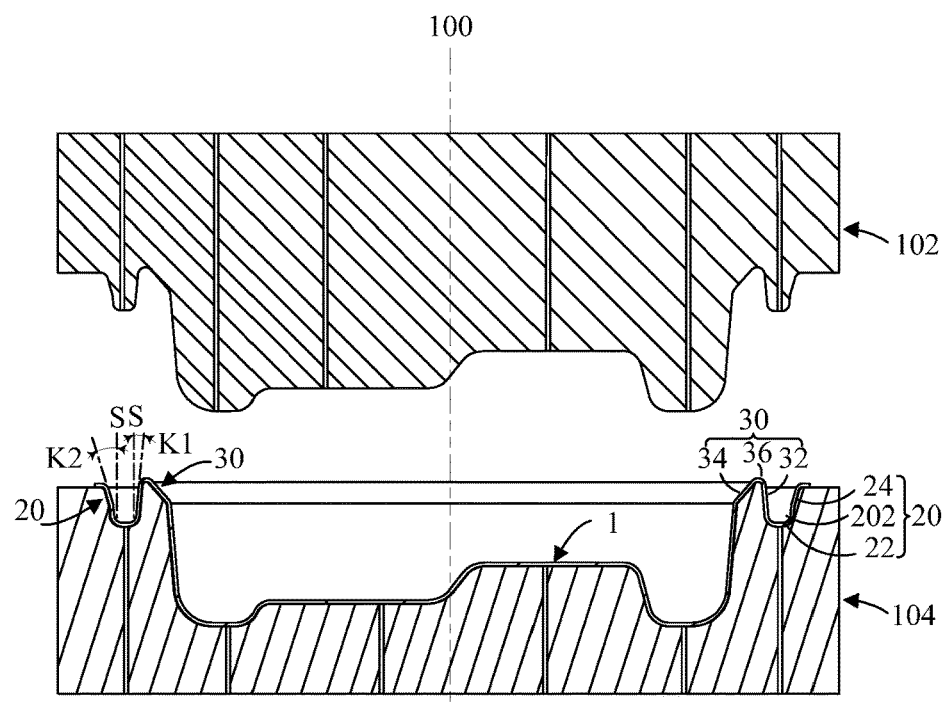
FIG. 7 depicts a laterally cross-sectional diagram of two upper and lower mold assemblies configured for thermo-compressively forming the pulp-molded paper lid depicted in FIG. 1A.

Further referring to FIG. 7, which depicts a laterally cross-sectional diagram of two upper and lower mold assemblies 102, 104, both of which are configured for thermo-compressively forming said pulp-molded paper lid 1 shown in FIG. 1A, the demolded surfaces of both of the entire 'V'-shaped cross section structure of said generating-elasticity device 30 (as comprising said movable bearing wall 32, said movable linkage wall 34 and said at least one movable bended end 36) and said topside ring 20 all are formed at positive draft angles relative to the central longitudinal axis 100 of both of said upper and lower mold assemblies 102, 104 (wherein said central longitudinal axis 100 is parallel to only one (i.e. vertical) demolding direction of said pulp-molded paper lid 1). For example, in view of the left side of FIG. 7, demolded surfaces of both of said generating-elasticity device 30 and said topside ring 20 respectively have positive draft angles K1, K2 relative to said central longitudinal axis 100 of both of said upper and lower mold assemblies 102, 104 (wherein said central longitudinal axis 100 is parallel to only one (i.e. vertical) demolding direction of said pulp-molded paper lid 1). Actually, the demolded surfaces of the entire structure of said pulp-molded paper lid 1 all have the positive draft angles relative to said central longitudinal axis 100 of both of said upper and lower mold assemblies 102, 104. For example, an inner sidewall surface of each of said close end 22, said movable bearing wall 32 and said outermost sidewall 24 of said topside ring 20, all of which are configured to define the entire space region 202, and the other demolded surfaces which are respectively configured to form the other various elements, such as said central dominating portion 10 and set forth, all have the positive draft angles relative to said central longitudinal axis 100 of both of said upper and lower mold assemblies 102, 104. With the design of said pulp-molded paper lid 1 according to the present invention, this is capable of simplifying and decreasing the structures assembled into said two upper and lower mold assemblies 102, 104, reducing its molding hardware costs and conveniently maintaining and repairing, and a production cycle time of said respective pulp-molded paper lid 1, thereby benefiting an automatic mass production of its consistent and continuous production machines, ensuring its higher production yield and quality, and raising its automated production efficiency. Furthermore, such a design of the pulp-molded paper lid 1 according to the present invention is capable of avoiding the technical problems of the conventional pulp-molded cup lid that it essential to increase an extra horizontal sliding block or an extra vertical mold spring device, employed for compression forming a number of negative-draft-angle portions (such as said latch structure or said snap-in groove structure) on its mold assembly. The extra horizontal sliding block or the extra vertical mold spring device would invoke the number of the mold assembly increased and complicated, its molding hardware costs rising and a difficulty of maintaining and repair. For a conventional laterally-demolding design, it also apt to incur a permanent deformation of a part of lateral structures formed in the conventional pulp-molded cup lid and therefore cause its production yield rate worse. Simultaneously, a lot of its different portions that are respectively formed in turns of the positive draft angles and the negative draft angles would also extend a production cycle time of the respective conventional pulp-molded cup lid.

Figure 8:
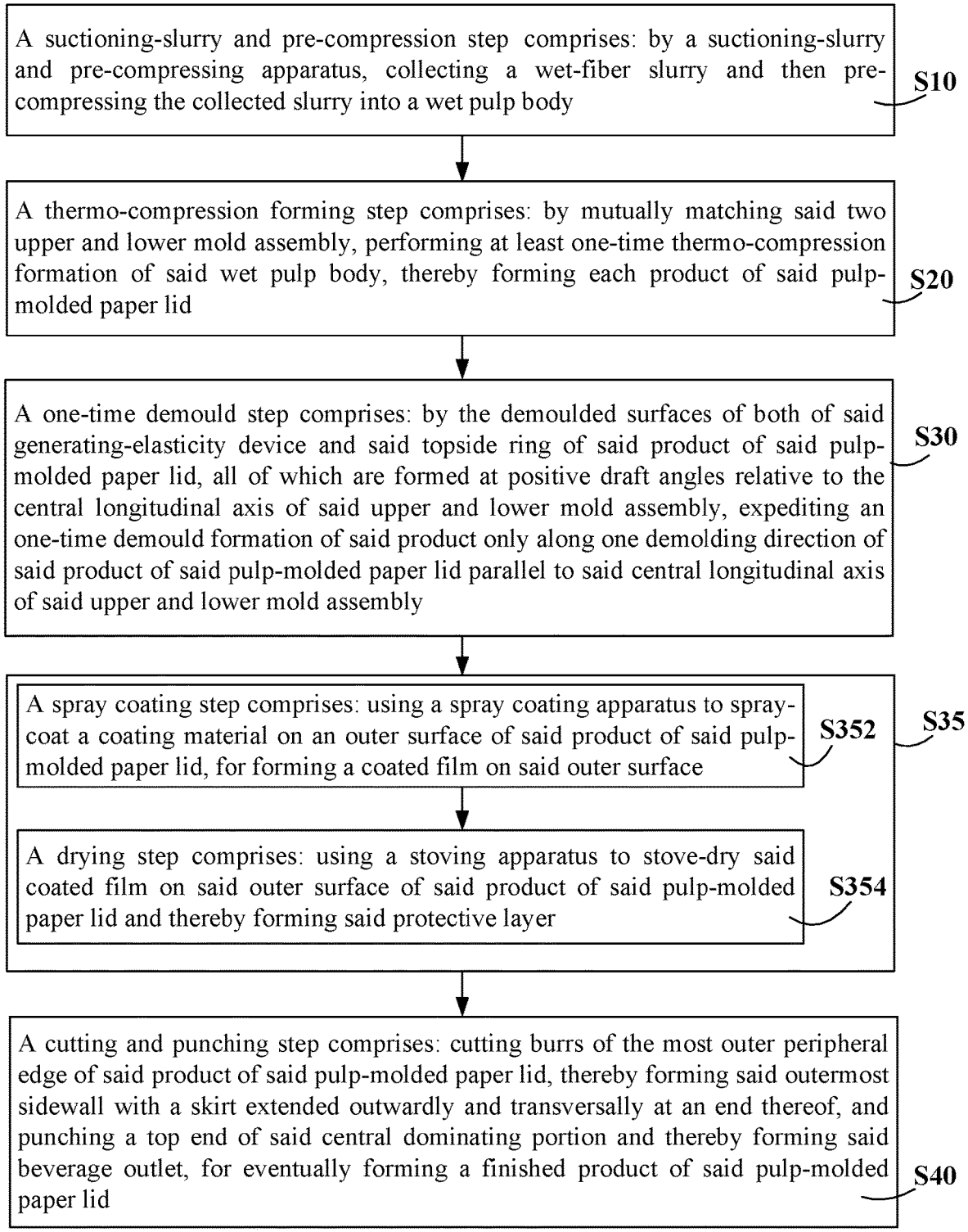
FIG. 8 depicts a flow chart of a method for fabricating a pulp-molded paper lid for a beverage cup, according to a preferred embodiment of the present invention.

Further referring to FIG. 8, FIG. 8 depicts a flow chart of a method for fabricating a pulp-molded paper lid for a beverage cup, according to a preferred embodiment of the present invention. For conveniently understanding each step of the flow chart (as depicted in FIG. 8) with regard to the method for fabricating the pulp-molded paper lid, please refer to various elements of said pulp-molded paper lid 1 previously mentioned in the corresponding illustrations from FIG. 1A to FIG. 7. In this embodiment, the method for fabricating said pulp-molded paper lid 1 according to the present invention is performed by consistently and continuously automated production machines with relation to a wet-fiber pulp-molded process, which comprises the steps as follows.

A suctioning-slurry and pre-compression step S10, comprises the steps of: by a suctioning-slurry and pre-compressing apparatus, collecting a wet-fiber slurry and then pre-compressing the collected slurry into a wet pulp body. Preferably, said slurry contains a number of wet fibers which consists of 60% by weight of long plant fibers and 40% by weight of short plant fibers, thereby strengthening a structurally-interlacing strength of said pulp-molded paper lid 1 depicted in FIGS. 2C and 3. Preferably, a fiber length of said respective long plant fibers is larger than 2 mm, and a fiber length of said respective short plant fibers is smaller than 2 mm but larger than 1.4 mm.

A thermo-compression forming step S20, comprises the steps of: by mutually matching said two upper and lower mold assemblies 102, 104 (as depicted in FIG. 7), performing at least one-time thermo-compression formation of said wet pulp body, thereby forming each product of said pulp-molded paper lid 1 (as depicted in FIGS. 2C and 3). The mentioned-herein product comprises, but is not limited to, one of a semi-finished product, a ready-to-process product and a finished product of said pulp-molded paper lid 1.

A one-time demold step S30, comprises the steps of: by the demolded surfaces of both of said generating-elasticity device 30 and said topside ring 20 of said product of said pulp-molded paper lid 1, all of which are formed at positive draft angles relative to the central longitudinal axis 100 of both of said upper and lower mold assemblies 102, 104 as depicted in FIG. 7, expediting a one-time demold formation of said product only along one (i.e. vertical) demolding direction of said product of said pulp-molded paper lid 1 parallel to said central longitudinal axis 100 of both of said upper and lower mold assemblies 102, 104. Preferably, demolded surfaces of the entire structure of said product of said pulp-molded paper lid 1 all are formed at positive draft angles relative to said central longitudinal axis 100 of both of the upper and lower mold assemblies 102, 104.

A cutting and punching step S40, comprises the steps of: cutting burrs of the most outer peripheral edge of said product of said pulp-molded paper lid 1, thereby forming said outermost sidewall 24 (as depicted in FIG. 3), with a skirt 242 extended outwardly and transversally at an end thereof, and punching a top end of said central dominating portion 10 and thereby forming said beverage outlet 14 as depicted in FIG. 1A, for eventually forming a finished product of said pulp-molded paper lid 1 as depicted in FIGS. 1A and 1B. Simultaneously, said finished product of said pulp-molded paper lid 1 can conform with the regulations of U.S. FDA food grade registration certificate, thereby accomplishing the environmental protection requirements for both of the biodegradability and compostability. Preferably, the method for fabricating said pulp-molded paper lid according to the present invention further comprises the step of: before performing said cutting and punching step S40, firstly performing a protective layer forming step S35, which comprises, forming a protective layer (as a called"lamination") on said product of said pulp-molded paper lid 1 (as depicted in FIG. 3), for avoiding shrink-deformation resulted from contacting with a moisture, wherein said protective layer forming step S35 further comprises a spray coating step S352 which comprises: using a spray coating apparatus to spray-coat a coating material on an outer surface of said product of said pulp-molded paper lid 1, for forming a coated film on said outer surface; and preferably, spray-coating said coating material on the entirely outer contours of a bottom surface (see FIG. 1B) of said pulp-molded paper lid 1 and thereby forming the coated film thereon; and a drying step S354 which comprises: using a stoving apparatus to stove-dry said coated film on said outer surface of said product of said pulp-molded paper lid 1 and thereby forming said protective layer. Nevertheless, said protective layer forming step S35 is not limited to include said the spray coating step S352 and said drying step S354 since in the other embodiment, the other apparatus or the other process capable for forming said protective layer all can be performed. Preferably, said protective layer is composed of, but not limited to, an aqueous water-proof material. Said aqueous water-proof material consists of at least one additive. Said at least one additive comprises, but is not limited to, polyacrylic emulsion and a deionized water. Preferably, said protective layer has a coating amount of approximate 5-10 g/m2 and an abrasive wear resistance of 4 lbs./400 cycles. Said protective layer can conform with the various environmental protection standards RoHS/EN-71/ASTM/REACH/CPSIA; however, it will not therefore be limited to a composition of said protective layer since in the other embodiment, the others capable of accomplishment of avoiding shrink-deformation resulted from contacting with a moisture of protective layer material all can be used; in the other embodiment, said protective layer can conform with the regulations of U.S. FDA food grade registration certificate, thereby accomplishing the environmental protection requirements for both of the biodegradability and compostability.

Accordingly, the present invention is capable to providing the following beneficial effects that: compared with the prior arts, while the pulp-molded paper lid according to the present invention 1 bears the external pressure P1 to cover up the convex-ridge ring 60 around the opening 50 of the corresponding cup body 3, the entire 'V'-shaped cross sectional structure of the generating-elasticity device 30 of the pulp-molded paper lid 1 is pre-compressed to compressively deform, by the preloading of the insertion force F1 of said convex-ridge ring 60, and thereby expediting both said movable bearing wall 32 and said at least one movable bended end 36 of said generating-elasticity device 30 acting in a compressive displacement along the inward directions respectively opposite to said radial directions RD of said pulp-molded paper lid 1; and, both of said movable bearing wall 32 and said outermost sidewall 24 are formed respectively with two guiding slopes, each configured on a basis of an inclined plane principle, for guiding advantageously the sliding movement of said convex-ridge ring 60 of said corresponding cup body 3 into said downwardly-increased space region 2024 of said convex-ridge ring 20, thereby avoiding the technical problems of the conventional pulp-molded cup lid where its rigid internal sidewall firmed permanently at a right angle might be directly impacted to get permanently deformed by the insertion of said convex-ridge ring of said cup body. Furthermore, after said convex-ridge ring 60 of said cup body 3 is inserted into said upwardly-decreased space region 2022, said movable bearing wall 32 and said outermost sidewall 24 both are capable of respectively exerting said two reversed elastically-rebound forces F2, F3 by a stretched deformation occurring between said movable bearing wall 32 and said outermost sidewall 24, for clamp-retaining the two opposed sides of said convex-ridge ring 60 of said corresponding cup body 3 within said upwardly-decreased space region 2022 defined between said movable bearing wall 32 and said outermost sidewall 24, thereby avoiding the technical problems of the conventional pulp-molded paper lid where a latch structure having a permanent deformation or fractures might ineffectively snap-retains said convex-ridge ring of said cup body. Moreover, after the pulp-molded paper lid 1 according to the present invention completely accommodates said convex-ridge ring 60 of said corresponding cup body 3 therein and said external pressure P1 is removed, said generating-elasticity device 30 will be released from the pre-compression to exert preloaded elastic forces F4, along said radial directions RD of said pulp-molded paper lid 1, for said convex-ridge ring 60. Therefore, with a utilization of the present invention, in addition to exerting said two elastically-rebound forces F2, F3, said preloaded elastic forces F4 are capable to further strengthening the clamp-retention for tightly retaining said two opposed sides of said convex-ridge ring 60 of said corresponding cup body 3 into between said topside ring 20 and said generating-elasticity device 30 of said pulp-molded paper lid 1, thereby avoiding the technical problems of the conventional pulp-molded paper lid where a part of its latch structure or its snap-in groove structure inside the topside ring of the cup lid has an insufficient structural strength or elasticity such that the conventional pulp-molded paper lid is incapable of tightly snap-retaining the corresponding cup body. And, in the present invention, by said two upper and lower mold assemblies 102, 104 employed for the thermo-compression forming in the wet-fiber pulp-molded process, all of the demolded surfaces of both of said generating-elasticity device 30 and said topside ring 20 are formed at positive draft angles relative to the central longitudinal axis 100 of both the upper and lower mold assemblies 102, 104, thereby expediting all of the demolded surfaces of the entire structure of said pulp-molded paper lid 1 having the positive draft angles, so as to achieve a capability of simplifying and decreasing the structures assembled into said mold assembly, reducing its molding hardware costs and conveniently its maintaining and repairing, and shortening a production cycle time of said respective pulp-molded paper lid 1, for benefiting an automatic mass production of its consistent and continuous production machines, ensuring its higher production yield and quality, and raising its automated production efficiency.

As described above, although the present invention comprises been described with the preferred embodiments thereof, those skilled in the art will appreciate that various modifications, additions, and substitutions are possible without departing from the scope and the spirit of the invention. Accordingly, the scope of the present invention is defined only by reference to the claims.

What is claimed is:

1. A pulp-molded paper lid for a beverage cup, which is made by two upper and lower mold assemblies used for a thermo-compression forming in a wet-fiber pulp-molded process, the pulp-molded paper lid comprising:
    a topside ring, formed along an outer peripheral edge of the pulp-molded paper lid and having a close end located on the most top side of the topside ring, and an outermost sidewall downwardly-extended from one of two opposed sides of the close end, the topside ring configured for accommodating an insertion of a convex-ridge ring around an opening of a body of the corresponding cup; and
    a central dominating portion, formed on an upper part of the pulp-molded paper lid and having an annular sidewall located around a central short axis of the pulp-molded paper lid, and a beverage outlet formed on the central dominating portion;
wherein the pulp-molded paper lid further comprises:
    a generating-elasticity device, located between the annular sidewall of the central dominating portion and the topside ring, wherein along radial directions of the pulp-molded paper lid, the generating-elasticity device is respectively integrally formed with a movable bearing wall, a movable linkage wall and at least one bended end interconnecting between the movable bearing wall and the movable linkage wall to construct an angled corner having an included angle smaller than 90 degrees, which makes the entire structure of the generating-elasticity device forming a 'V'-shaped cross section having the same function as a preloaded spring, the movable bearing wall is permanently connected to the other one of the two opposed sides of the close end of the topside ring, the movable linkage wall has a fixed end permanently connected to the annular sidewall and having an included angle relative to the annular sidewall, and while the topside ring of the pulp-molded paper lid accommodates the convex-ridge ring of the corresponding cup body therein by bearing an external pressure thereon, the movable bearing wall directly bears an insertion force of the convex-ridge ring to invoke a compressive deformation occurring in the angled corner of the at least one bended end, thereby accomplishing a pre-compression preloaded on the generating-elasticity device, and the movable linkage wall is simultaneously pre-compressed to act in a rotative movement pivoted on the fixed end and to act with a stretched deformation which enlarges the included angle of the fixed end to raise the pre-compression higher preloaded for the entire structure of the generating-elasticity device, and by removal of the external pressure, the angled corner of the at least one movable bended end is released to elastically rebound deform, thereby accomplishing a manner that the generating-elasticity device is released from the pre-compression to exert preloaded elastic forces, through the movable bearing wall, toward the convex-ridge ring of the corresponding cup body, along the radial directions of the pulp-molded paper lid, wherein the generating-elasticity device exerts the preloaded elastic forces to be only one way of strengthening a clamp-retention manner that the movable bearing wall and the outermost sidewall both respectively clamp-retain two opposed sides of the convex-ridge ring of the corresponding cup body within a restricting-movement space defined among the movable bearing wall, the close end and the outermost sidewall, only by two planar inner sidewall surfaces which are respectively formed inside both the movable bearing wall and the outermost sidewall to clamp-retain the two opposed sides of the convex-ridge ring but to avoid formation of latch structure on either of the movable bearing wall and the outermost sidewall to snap retention with the convex-ridge ring.

2. The pulp-molded paper lid for the beverage cup as claimed in claim 1, wherein the movable linkage wall and the annular sidewall both are interconnected with each other via the fixed end to construct a '<'-shaped cross section having the included angle larger than 100 degrees relative to the annular sidewall.

3. The pulp-molded paper lid for the beverage cup as claimed in claim 1, wherein, while the topside ring of the pulp-molded paper lid bears the external pressure to accommodate the convex-ridge ring of the corresponding cup body, the movable linkage wall is pivoted on the fixed end to act, far away from the annular sidewall but near to the movable bearing wall, with occurrence of the reflection deformation or the stretched deformation therein.

4. The pulp-molded paper lid for the beverage cup as claimed in claim 1, wherein, while the topside ring of the pulp-molded paper lid bears the external pressure to accommodate the convex-ridge ring of the corresponding cup body, the movable bearing wall and the at least one bended end both are acted, by preloading of the insertion force of the convex-ridge ring, in a displacement along inward directions respectively opposite to the radial directions of the pulp-molded paper lid, and by removal of the external pressure, the movable bearing wall and the at least one bended end both are acted in an elastic rebound displacement along the radial directions of the pulp-molded paper lid.

5. The pulp-molded paper lid for the beverage cup as claimed in claim 1, wherein, by removal of the external pressure, the angled corner of the at least one bended end and the movable linkage wall both are acted with elastic rebound deformations to make the movable bearing wall being released from the pre-compression to exert the pre-loaded elastic forces, along the radial directions of the pulp-molded paper lid, for retaining the convex-ridge ring of the corresponding cup body.

6. The pulp-molded paper lid for the beverage cup as claimed in claim 1, wherein the outermost sidewall has an inner side formed with the planar inner sidewall surface and an inflection point thereon, the inflection point divides the restricting-movement space into an upwardly-decreased space region and a downwardly-increased space region directly connected below the upwardly-decreased space region, the downwardly-increased space region is defined between low half portions of both the movable bearing wall and the outermost sidewall, the two planar inner sidewall surfaces of the movable bearing wall and the outermost sidewall both are respectively formed with two guiding slopes extended downwardly far away from each other, each of the two guiding slopes is configured on a basis of an inclined plane principle, for guiding advantageously a sliding movement of the convex-ridge ring of the corresponding cup body into the downwardly-increased space region, through an annular downward groove formed on a bottom portion of the downwardly-increased space region.

7. The pulp-molded paper lid for the beverage cup as claimed in claim 6, wherein, after the convex-ridge ring of the corresponding cup body passes through the inflection point of the outermost sidewall to be inserted from the downwardly-increased space region into the upwardly-decreased space region, the movable bearing wall and the outermost sidewall both respectively exert two reversed elastically-rebound forces by a stretched deformation occurring between the movable bearing wall and the outermost sidewall, for clamp-retaining the two opposed sides of the convex-ridge ring of the corresponding cup body within the upwardly-decreased space region.

8. The pulp-molded paper lid for the beverage cup as claimed in claim 1, wherein the generating-elasticity device and the topside ring both have demolded surfaces which are formed at positive draft angles relative to a central longitudinal axis of the upper and lower mold assemblies.

9. The pulp-molded paper lid for the beverage cup as claimed in claim 1, wherein a protective layer is further formed on an outer surface of the pulp-molded paper lid to prevent the pulp-molded paper lid from shrink-deforming after contacting with a moisture.

10. A pulp-molded paper lid for a beverage cup, which is made by two upper and lower mold assemblies used for a thermo-compression forming in a wet-fiber pulp-molded process, wherein, the pulp-molded paper lid comprises:
a topside ring, formed along an outer peripheral edge of the pulp-molded paper lid and having an outermost sidewall located on one of two opposed sides of the topside ring and downwardly extended, the topside ring configured for accommodating an insertion of a convex-ridge ring around an opening of a body of the corresponding cup; and
a central dominating portion, formed on an upper part of the pulp-molded paper lid and having an annular sidewall located around a central short axis of the pulp-molded paper lid, and a beverage outlet formed on the central dominating portion;
wherein the pulp-molded paper lid further comprises:
a generating-elasticity device, located between the annular sidewall of the central dominating portion and the topside ring, wherein along radial directions of the pulp-molded paper lid, the generating-elasticity device is respectively integrally formed with a movable bearing wall, a movable linkage wall and at least one bended end interconnecting between the movable bearing wall and the movable linkage wall to construct an angled corner having an included angle smaller than 90 degrees, which makes the entire structure of the generating-elasticity device forming a 'V'-shaped cross section having the same function as a preloaded spring, the movable bearing wall is permanently connected to the other one of the two opposed sides of the topside ring, the movable linkage wall has a fixed end permanently connected to the annular sidewall and having an included angle relative to the annular sidewall, a first transversely cross-sectional width is defined among the movable bearing wall, the movable linkage wall and the at least one bended end and is extended along the radial directions of the pulp-molded paper lid, while the topside ring of the pulp-molded paper lid accommodates the convex-ridge ring of the corresponding cup body therein by bearing an external pressure thereon, the first transversely cross-sectional width of the generating-elasticity device is acted as pre-compressed, and the movable linkage wall is simultaneously pre-compressed to act in a rotative movement pivoted on the fixed end and to act with a stretched deformation which enlarges the included angle of the fixed end to raise the pre-compression higher for the entire structure of the generating-elasticity device, with a compressive deformation occurring therein along the radial directions of the pulp-molded paper lid, to become a second transversely cross-sectional width, and by removal of the external pressure, the generating-elasticity device is released from the pre-compression to exert preloaded elastic forces through the movable bearing wall, toward the convex-ridge ring of the corresponding cup body, along the radial directions of the pulp-molded paper lid, and the second transversely cross-sectional width becomes a third transversely cross-sectional width, wherein the generating-elasticity device exerts the preloaded elastic forces to be only one way of strengthening a clamp-retention manner that the movable bearing wall and the outermost sidewall both respectively clamp-retain two opposed sides of the convex-ridge ring of the corresponding cup body within between the movable bearing wall and the outermost sidewall, only by two planar inner sidewall surfaces which are respectively formed inside both the movable bearing wall and the outermost sidewall to clamp-retain the two opposed sides of the convex-ridge ring but to avoid formation of latch structure on either of the movable bearing wall and the outermost sidewall to snap retention with the convex-ridge ring, and wherein the third transversely cross-sectional width is smaller than each of the first transversely cross-sectional width and the second transversely cross-sectional width.

11. The pulp-molded paper lid for the beverage cup as claimed in claim 10, wherein the second transversely cross-sectional width is smaller than the first transversely cross-sectional width.

12. The pulp-molded paper lid for the beverage cup as claimed in claim 10, wherein the generating-elasticity device and the topside ring both have demolded surfaces which are formed at positive draft angles relative to a central longitudinal axis of the upper and lower mold assemblies.

* * * * *